Figure 1:
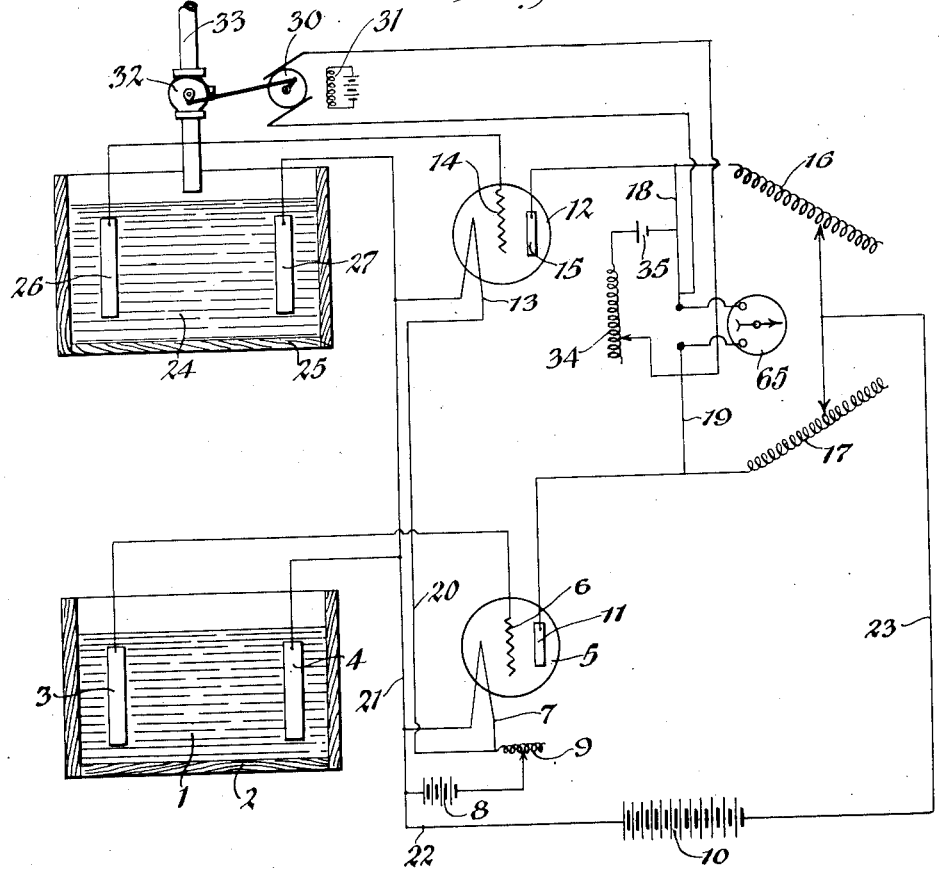

June 11, 1935.  A. H. DAVIS, JR  2,004,569

ELECTROMETRIC DETERMINATIONS

Filed May 14, 1926

Inventor
A. H. DAVIS, Jr.
by William J. Karslake
Attorney

Patented June 11, 1935

2,004,569

UNITED STATES PATENT OFFICE 2,004,569

ELECTROMETRIC DETERMINATIONS

Archibald H. Davis, Jr., Buffalo, N. Y., assignor to National Aniline & Chemical Co., Inc., New York, N. Y., a corporation of New York Application May 14, 1926, Serial No. 109,116

7 Claims. (Cl. 175—183)

This invention relates to electrometric determinations, and more particularly to such determinations wherein the characteristics of a three electrode vacuum tube are utilized.

Electrometric methods in general are based upon determinations of conductivity or differences in potential. Thus, for indicating the properties of substances, particularly of a solution, measurements of the conductivity of the solution between spaced electrodes or of the potential difference existing between the electrodes can be made to furnish very accurate indications concerning a solution, such as its acidity or basicity. However, such measurements as heretofore conducted require that the current passing between the electrodes cause polarization insufficient to vitiate the state of potential existing at the electrodes serving as a true measure of the conductivity of the solution. The electron tube should be admirably adapted for such measurements since, with a proper circuit, the difference in potential of the electrodes can be impressed on the grid to correspondingly modify the plate current with a negligible grid current, if any. But the electron tube is sensitive to filament current changes and also to variations in the plate voltage, and to the extent affected does not truly reflect the conditions indicated.

This invention has for an object the utilization of the characteristics of a three electrode tube for electrometric indications or determinations generally. Another object is an electrode tube indicator that is unresponsive to filament current or plate voltage changes. A further distinctive object is the inclusion of an indicator of this type in a system for preparing or maintaining a solution or other substance in accord with arbitrary conditions. As a corollary, this invention contemplates such a maintenance of predetermined standard conditions automatically and continuously. These and other objects will hereinafter appear.

In the drawing which accompanies this specification

Figure 2:
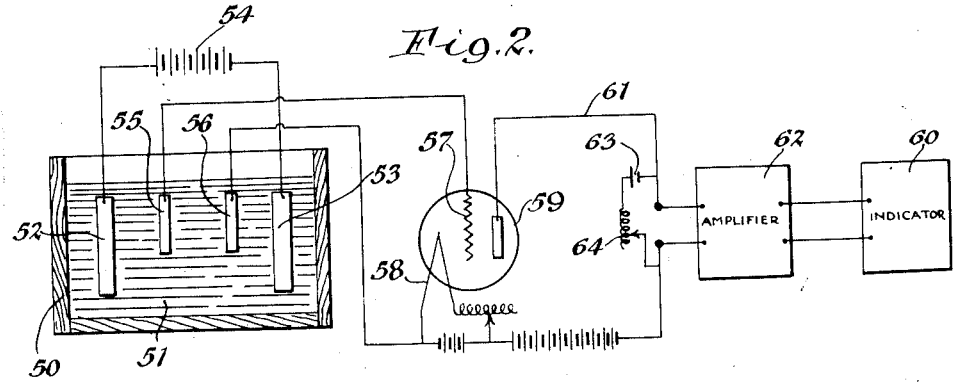

Fig. 1 shows a diagrammatic arrangement of the apparatus for ion concentration measurements in solutions; and Fig. 2 is a diagrammatic illustration of a simplified form for conductivity measurements.

A solution 1 contained in a vessel 2 has immersed therein electrodes 3 and 4. A vacuum tube 5 has its grid 6 connected with one of these electrodes and the other electrode is associated with the filament 7. A usual battery 8 or its equivalent and variable resistance 9 are provided for heating the filament to the desired temperature. Another battery 10 or its equivalent furnishes the voltage required to cause an electron flow from the filament 7 to the plate 11.

For nullifying the effect of changes in the filament current and plate voltage, a preferred form of apparatus comprises a second vacuum tube 12 with the filament 13, grid 14 and plate 15 so arranged as to balance the first tube in these respects. One way of securing such a balance is by means of a Wheatstone or a Kelvin bridge arrangement. For simplicity a Wheatstone bridge is shown, the tube 5 being in one arm, the tube 12 being in a second arm, and known variable resistances 16 and 17 constituting the third and fourth arms. Leads 18 and 19 extend across the bridge and to these any suitable indicator (such as indicator 65), continuous recorder, or other operating mechanism, such as the motor 30, described below, can be connected. The filaments 7 and 13 are connected in parallel with each other and in series with the source of current 8 and the resistance 9 through the lines 20, 21; consequently both filaments are heated by currents resulting from the application of the same voltage. With filaments of equal resistance, or readily made so by the interposition of a variable resistance if necessary, the common voltage results in equal filament currents, both changing equally and simultaneously; accordingly both tubes are subject to the same filament current changes. The plate battery 10 is connected to the line 21 extending from filament 7 to filament 13 by a lead 22, and the plates 11 and 15 are connected through the resistances 16, 17 and the common return 23 to the battery 10. Accordingly both tubes can be adjusted to operate under the same plate voltage.

The electrodes may be of any known types, such as the hydrogen and calomel electrodes in general use in connection with aqueous solutions. Instead of separated electrodes they can be combined in a unitary structure as shown in the patent to Keeler, 1,474,594, Nov. 20, 1923. Also in place of stationary solutions held in vessels, either one or both may be flowing solutions for which use electrodes of the type described in the Journal of Industrial & Engineering Chemistry, (Vol. 14, page 395) are suitable.

The apparatus described is capable of several applications; but for the purpose of illustration, one including two solutions is selected. In this case a second solution 24 in a vessel 25 with electrodes 26, 27 is connected with the filament 13 and grid 14 of the tube 12. Either one of the solutions 1 or 24 can be a standard solution, arbitrarily selected, and the other the solution under observation. If 1 be the standard, and if it be desired, for example, to bring the ionization potential in the solution 24 into correspondence with that of solution 1 as a reference potential, the variable resistance arms 16 and 17 can be made equal and a suitable reagent or reagents added to solution 24 until the indicating device 65 across the leads 18 and 19 shows no deflection. This means that both solutions then exhibit the same ionization potential which is impressed on their respective grid-filament circuits. With the grids of each tube under a suitable negative potential, no current flows; consequently the hydrogen electrode (generally used in aqueous solutions) is not discharged nor is there any polarization to vitiate the results obtained.

Again, if the standard solution 1 is a normal solution, and a one-tenth normal solution, for example, is desired in vessel 25, the resistances 16 and 17 are properly proportioned, that is, resistance 17 is made a fraction of the resistance 16, previously determined by balancing the bridge with the desired one-tenth normal solution in the vessel 25. The balancing solution is then replaced and the reagent is added to solution 24 until the null point is indicated across the bridge. The balanced setting of the bridge can be preserved for future use by calibrating the resistances.

The apparatus also lends itself to use with a single solution. In this case the electrodes can be of dissimilar constitution so that each tube responds to a different ion concentration. For example, the grid of tube 5 can be subjected to the hydrogen ionization potential and that of tube 12 to the potential of the hydroxyl ion and, since the product of their concentrations is constant, an increase in the hydrogen ion concentration is accompanied by a proportionate decrease in hydroxyl ion concentration; the grid potential of tube 5 is thereupon increased while that of tube 12 is correspondingly decreased. With this arrangement a null point determination is obtainable by adjusting the known resistances 16, 17 and the resistance settings thereupon indicate the ionization potentials; or a fixed resistance ratio can be maintained in which case the indicator or other device across the bridge can furnish a direct means for reading the potentials.

Addition of reagents can be made manually or an automatic means can be utilized. The figure diagrammatically illustrates one arrangement for automatic operation. A motor 30, that is operable by very small currents, is connected across the leads 18 and 19, having a separately excited field 31, the motor being associated with a valve 32 in a supply pipe 33. With a higher plate voltage on tube 12, current will flow from lead 18 through the motor to the lead 19, and with a higher plate voltage on tube 5, a current will flow through the motor in the reverse direction. One direction of rotation can be utilized for opening and the reverse direction for closing the valve 32. As the ion concentrations for example approach equality the current through the motor gradually ceases; and with any further addition of reagent, the current reverses cutting off the flow.

Various other known devices responsive to small currents, such as a polarized relay, can be readily substituted for the motor arrangement disclosed.

The solution being treated can be a flowing solution in which case the reagent addition can be controlled from the standard solution by the means above disclosed. It is evident that the control can be duplicated for the addition of more than one reagent.

As an indicating device across the leads 18 and 19, the device or any other suitable construction as above suggested can be used, and if found necessary an amplifier can be interposed to give sufficient current for operating the device. Where the instrument is calibrated or where null-point determinations are not used, it can be shunted with an adjustable resistance 34, or an opposing source of potential 35 can be connected across the instrument, particularly to render the control inactive at a predetermined unbalance between the two sides of the bridge.

While the foregoing description has been directed to potential measurements based on ion concentrations, the invention relates to electrometric measurements generally, for it is also applicable to conductivity indications which depend upon the presence of a solution current. For measurements of conductivity it is customary to use an alternating current of high frequency to avoid as much as possible the effect of polarization at the electrodes. However, the present invention is amenable to the use of a direct current for creating the potential without polarization as well as an alternating current, and such an arrangement is shown in Fig. 2, the single unbalanced tube being selected for this illustration.

A vessel 50 containing a solution 51, whose conductivity is to be determined, has immersed therein electrodes 52, 53 connected to a direct current source 54. Suitably spaced electrodes 55, 56, are inserted between the electrodes 52, 53, and the electrodes 55, 56 are connected to the grid 57 and filament 58 of an electron tube 59. Any suitable indicator or other device 60, as suggested above, is connected in the plate circuit 61 and an amplifier 62 can be interposed if desired. An opposing source of potential 63 and variable resistance 64, either separately or combined, can also be provided.

With an electric current passing through the solution by means of the electrodes 52, 53, a difference of potential is set up between the electrodes 55, 56 and consequently between the grid and filament of the electron tube. However, as no current flows in the grid-filament circuit, no polarization takes place at the electrodes 55, 56, and an accurate determination of the solution conductivity is thus made possible.

With an electron tube that is not balanced for filament current or plate voltage changes, as shown in Fig. 2, it is desirable to operate the filament at a constant temperature and at the saturation value of the plate current. Balancing the tube for these variable factors obviates their effect upon measurements; and with the use of a second tube, a single solution or a plurality of solutions can be used.

I claim:

1. An apparatus for electrometric determinations which comprises two pairs of electrodes each of which is positioned in a liquid conductor, two electron tubes, grid circuits associated with each of said tubes, the grid circuit of one tube including one of the aforesaid pairs of electrodes and the grid circuit of the other tube including the other of the aforesaid pairs of electrodes, filament circuits in parallel association with both tubes and including a source of electric current for heating the tube filaments common to both filaments, plate circuits in parallel association with both tubes and including a source of electric current common to both circuits, and an electric current indicating means associated with both of said plate circuits whereby the ratio of the current in one of said circuits to the current in the other of said circuits is indicated.

2. In an electrometric system the combination of an electron tube, means for producing a zone of potential gradient within a liquid conductor, means for impressing a potential difference in the zone to be measured upon the grid of said tube, a second electron tube subject to the same filament voltage as the first named tube, means for impressing a reference potential upon the grid of the second tube, means for maintaining the plate voltages of said tubes at a constant ratio while the system is balanced, and measuring means responsive to changes in the plate voltage of one tube relative to the plate voltage of the other tube.

3. In an electrometric system the combination of a pair of matched electron tubes subject to the same filament voltage, and during conditions of balance being subject to the same plate voltage, means for producing a zone of potential gradient within a liquid conductor, means for impressing a potential difference in the zone to be measured upon the grid of one of said tubes, means for impressing a reference potential upon the grid of the second tube, and measuring means connected across the respective plates, responsive to changes in the plate voltage of one tube relative to the plate voltage of the other tube.

4. In an apparatus of the character described, the combination of a pair of electron tubes subject to the same filament voltage and, during conditions of balance, subject to the same plate voltage, means for producing a zone of potential gradient within a liquid conductor, means for impressing a potential difference in the zone to be measured upon the grid of one of said tubes, means for impressing a reference potential upon the grid of the other tube, means connected across the respective plates of said tubes responsive to changes in the plate voltage of one tube relative to the plate voltage of the other tube, and means for balancing the plate voltages of said tubes.

5. In an electrometric system, the combination of a pair of electron tubes subject to the same filament voltage and, during conditions of balance, subject to the same plate voltage, means for producing a zone of potential gradient within a liquid conductor, means for impressing a potential difference in the zone to be measured upon the grid of one of said tubes, means for impressing a reference potential upon the grid of the other tube, measuring means connected across the respective plates of said tubes responsive to changes in the plate voltage of one tube relative to the plate voltage of the other tube, and means for balancing the plate voltages of said tubes, said means including a variable resistance in the plate-filament circuit of each of said tubes.

6. An apparatus of the character described, which comprises two electron tubes, grid circuits associated with each of said tubes, the grid of one tube being connected to an electrode positioned in a liquid conductor and the grid of the other tube being connected to another electrode positioned in a liquid conductor, filament circuits in parallel association with both tubes and including a source of electric current common to both filaments for heating the tube filaments, plate circuits in parallel association with both tubes and including a variable resistance in each plate circuit and a source of electric current common to both plate circuits, and means associated with both of said plate circuits responsive to changes in the ratio of the current in one of said plate circuits to the current in the other of said plate circuits.

7. An apparatus of the character described, which comprises two pairs of electrodes each of which is positioned in a liquid conductor, two electron tubes, grid circuits associated with each of said tubes, the grid circuit of one tube including one of the aforesaid pairs of electrodes and the grid circuit of the other tube including the other of the aforesaid pair of electrodes, filament circuits in parallel association with both tubes and including a source of electric current common to both filaments for heating the tube filaments, plate circuits in parallel association with both tubes and including an independently variable resistance in each plate circuit and a source of electric current common to both plate circuits, and means associated with both of said plate circuits responsive to changes in the ratio of the current in one of said circuits to the current in the other of said circuits.

ARCHIBALD H. DAVIS, Jr.